(12) United States Patent
Wilson

(10) Patent No.: US 8,942,682 B2
(45) Date of Patent: Jan. 27, 2015

(54) NETWORK ELEMENT, TELECOMMUNICATION SYSTEM, INTEGRATED CIRCUIT AND A METHOD FOR PROVIDING A TELEPHONY CONNECTION

(75) Inventor: Steven Wilson, Stonehouse (GB)

(73) Assignee: Freescale Semiconductor, Inc., Austin, TX (US)

( * ) Notice: Subject to any disclaimer, the term of this patent is extended or adjusted under 35 U.S.C. 154(b) by 158 days.

(21) Appl. No.: 13/521,478

(22) PCT Filed: Jan. 22, 2010

(86) PCT No.: PCT/IB2010/050285
§ 371 (c)(1),
(2), (4) Date: Jul. 11, 2012

(87) PCT Pub. No.: WO2011/089476
PCT Pub. Date: Jul. 28, 2011

(65) Prior Publication Data
US 2013/0130667 A1 May 23, 2013

(51) Int. Cl.
| | | |
|---|---|---|
| *H04M 3/42* | (2006.01) |
| *H04B 7/00* | (2006.01) |
| *H04W 4/16* | (2009.01) |
| *H04M 1/253* | (2006.01) |
| *H04M 1/725* | (2006.01) |
| *H04W 88/18* | (2009.01) |
| *H04W 88/06* | (2009.01) |
| *H04M 3/56* | (2006.01) |
| *H04M 7/00* | (2006.01) |
| *H04W 84/10* | (2009.01) |
| *H04W 84/16* | (2009.01) |
| *H04W 84/18* | (2009.01) |

(52) U.S. Cl.
CPC .............. *H04W 4/16* (2013.01); *H04M 1/2535* (2013.01); *H04M 1/725* (2013.01); *H04W 88/18* (2013.01); *H04W 88/06* (2013.01); *H04M 3/56* (2013.01); *H04M 7/0069* (2013.01); *H04M 2250/02* (2013.01); *H04M 2250/62* (2013.01); *H04W 84/105* (2013.01); *H04W 84/16* (2013.01); *H04W 84/18* (2013.01)
USPC ........................ 455/416; 455/41.2; 455/426.1

(58) Field of Classification Search
CPC .... H04W 84/18; H04W 4/008; H04W 84/105
USPC ............ 455/416, 426.1, 41.1, 41.2, 443, 444
See application file for complete search history.

(56) References Cited

U.S. PATENT DOCUMENTS

2005/0020209 A1* 1/2005 Camp .......................... 455/41.2
2006/0079181 A1* 4/2006 Yun et al. ..................... 455/41.2
(Continued)

OTHER PUBLICATIONS

International Search Report and Written Opinion correlating to PCT/IB2010/050285 dated Oct. 21, 2010.

*Primary Examiner* — Daniel Lai

(57) ABSTRACT

A network element comprises a radio frequency (RF) transceiver module and a signal processing module operably coupled to the RF transceiver module and arranged to enable at least one telephony connection to be established over a first communication network between the network element and a plurality of local wireless communication units. The signal processing module is further arranged to enable a piconet to be established where the piconet comprises the network element and the plurality of wireless communication units. The signal processing module is further arranged to establish a common telephony connection between the piconet and at least one remote device over a second communication network.

19 Claims, 5 Drawing Sheets

(56) References Cited

U.S. PATENT DOCUMENTS

| | | |
|---|---|---|
| 2006/0203807 A1 | 9/2006 | Kouretas et al. |
| 2007/0064682 A1 | 3/2007 | Adams et al. |
| 2007/0121604 A1 | 5/2007 | Chandra et al. |
| 2007/0121859 A1 | 5/2007 | Smelyansky et al. |
| 2007/0264988 A1* | 11/2007 | Wilson et al. .................. 455/416 |
| 2008/0026787 A1 | 1/2008 | Ibrahim et al. |
| 2008/0037725 A1 | 2/2008 | Berstis et al. |
| 2008/0102793 A1* | 5/2008 | Ananthanarayanan et al. ............................ 455/411 |
| 2010/0240347 A1* | 9/2010 | Abramsky ................. 455/414.1 |

* cited by examiner

NETWORK ELEMENT, TELECOMMUNICATION SYSTEM, INTEGRATED CIRCUIT AND A METHOD FOR PROVIDING A TELEPHONY CONNECTION

FIELD OF THE INVENTION

The field of this invention relates to a network element, a telecommunication system and a method for providing a telephony connection.

BACKGROUND OF THE INVENTION

In the field of telephone conferencing, it is known for various users to 'dial-in', or otherwise connect to, a conference bridge from a variety of locations in order to participate in a telephone conference session. Typically, the conference bridge is provided by an external media server and, as such, the external media server 'hosts' the telephone conference session.

It is often the case that multiple users connect to a telephone conference session from a single location, such as an office building. Multiple users participating in such a telephone conference session from a common location may utilise, for example, a meeting room provided with telephone conferencing equipment, such that only a single connection into the telephone conference session is required for those multiple users. However, it is often the case that, for example due to time pressures, the need for computer access or a need to access other resources, etc, multiple users participating in a telephone conference session from a common location often dial-in to the telephone conference session using separate telephone connections. For example, multiple users within an office building may dial-in separately from their desks, or from specialised areas such as near to workstations or other forms of equipment.

FIG. 1 illustrates an example of a telephone conference session 100, as is known in the art. The telephone conference session 100 is hosted by an external media server, which for the illustrated example is in the form of a media gateway (MGW) 110, and which comprises a conference bridge (not shown) for establishing a telephone conference service between multiple connections.

Typically, users may access a telephone conference session being hosted by an external media server using fixed (land) lines, such as may form part of a public switched telephone network (PSTN), for example whereby a plurality of such fixed lines within, say, an office building, may be connected to the external media server via a local private branch exchange (PBX). Accordingly, for the illustrated example, a plurality of users located within a common location 130, such as within an office building, are participating in the telephone conference session 100 by way of a plurality of fixed-line telephone equipment, illustrated generally at 120, and a plurality of fixed-line telephone connections. For the illustrated example, the plurality of fixed line telephone equipment 120 is connected to the MGW 110 by a plurality of telephone lines 135 running between the common location 130 and the PBX 140, and a trunk line 145 running between the PBX 140 and the MGW 110.

Alternatively, users may access a telephone conference session being hosted by an external media server using mobile telephone handsets, whereby each mobile telephone handset may be connected to the external media server via a local base station, or femto-cell access point (AP) or NodeB in 3GPP ($3^{rd}$ Generation Partnership Project) parlance, with such a connection being routed through the core network of the wireless communication network to the external media server. Accordingly, for the illustrated example, a plurality of users located within a common location 160, such as within an office building, are participating in the telephone conference session 100 by way of a plurality of wireless communication units, such as mobile telephone handsets, illustrated generally at 150, and thus by way of a plurality of wireless telephone connections. For the illustrated example, the plurality of wireless communication units 150 are connected to the MGW 110 by a plurality of radio frequency (RF) connections 155 between themselves and one or more radio network sub-systems (RNSs) 170, for example comprising one or more local NodeBs 172 and one or more radio network controllers (RNCs) 174. Such a NodeB 172 may comprise a traditional macro-cell or micro-cell NodeB 172, as defined within the 3GPP specifications. Alternatively, such a NodeB 172 may comprise a femto-cell or pico-cell base station, often referred to as an access point (AP). The wireless telephone connections are then routed from the RNS 170, via a BACKHAUL connection 175 between each RNS 170 and its associated core network 180 to the MGW 110.

An advantage for a user to dial-in to the telephone conference session 100 using a wireless communication unit, such as a mobile telephone handset, is that it enables the user to dial-in from substantially anywhere, and to move around once participating in the telephone conference sessions 100, for example to move from their desk to, say, a work station, or between meeting rooms, etc, whilst staying active within the telephone conference session 100.

However, with the increasing use of wireless communication units, and the increasing demand for bandwidth, both in terms of wireless connections between wireless communication units and base stations, and within the wireless networks themselves, the use of multiple wireless connections by wireless communication units located within a common location when participating in a single telephone conference session is clearly an inefficient use of network resources.

Furthermore, the typical wireless network operator business model involves a wireless subscriber being charged for each connection from their wireless communication unit to the nearest base station, and then beyond that into the core network where a connection is established with, in this scenario, a media server hosting the telephone conference session. Accordingly, in the use of multiple wireless connections by wireless communication units located within a common location, when participating in a single telephone conference session, results in each of the wireless subscribers being individually charged for their respective wireless connection.

SUMMARY OF THE INVENTION

The present invention provides a network element, telecommunication system, a method for providing a telephony connection and a computer program product as described in the accompanying claims.

Specific embodiments of the invention are set forth in the dependent claims.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. In the drawings, like reference numbers are

DETAILED DESCRIPTION

The present invention will now be described in terms of a network element arranged to implement cordless telephony profile (CTP) gateway functionality, for example as defined within the BLUETOOTH® specifications developed by the BLUETOOTH® Special Interest Group (SIG) (www.bluetooth.org). BLUETOOTH® is a registered trademark of BLUETOOTH® SIG, INC., Suite 350, 5209 Lake Washington Boulevard, Kirkland, Wash. 98033. However, the present invention is not limited to such an implementation, and in other examples the present invention may be implemented within any arrangement whereby telephony connections may be established between a plurality of local wireless communication units and one or more remote devices.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
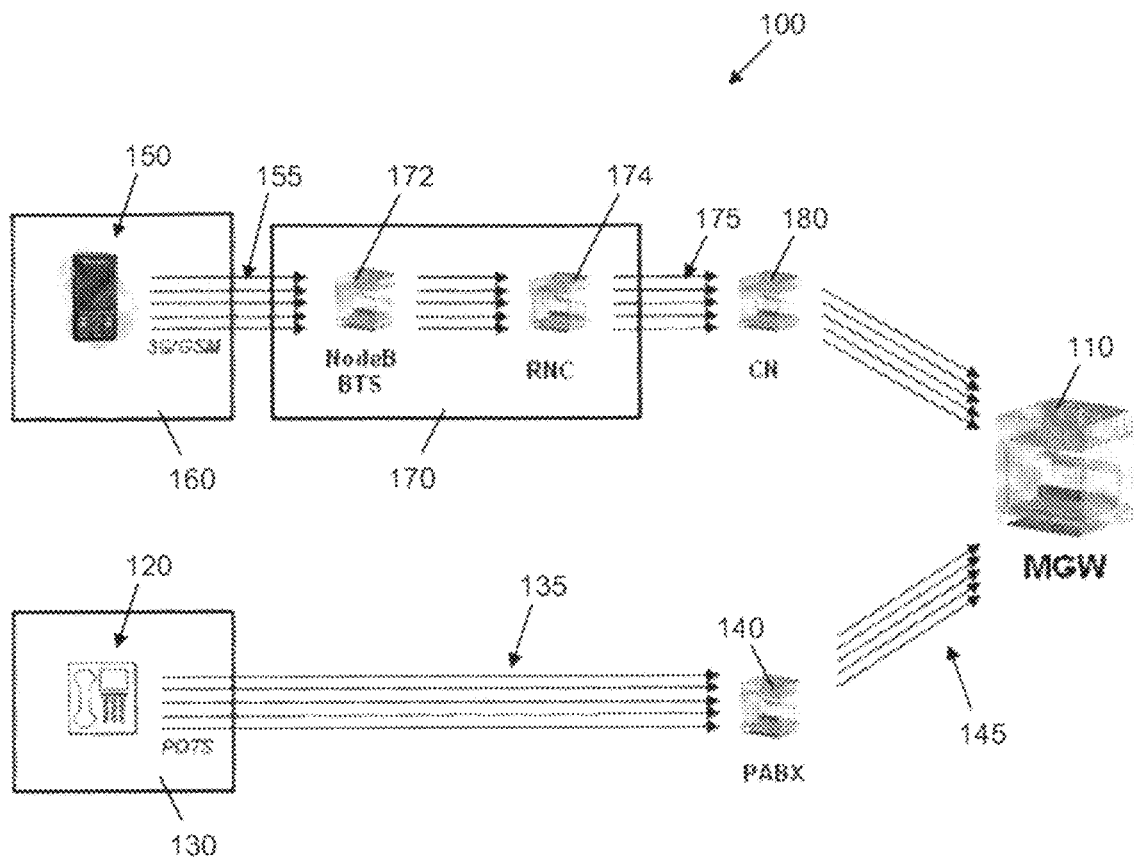
FIG. 1 illustrates an example of a known telephone conference session.
Figure 2:
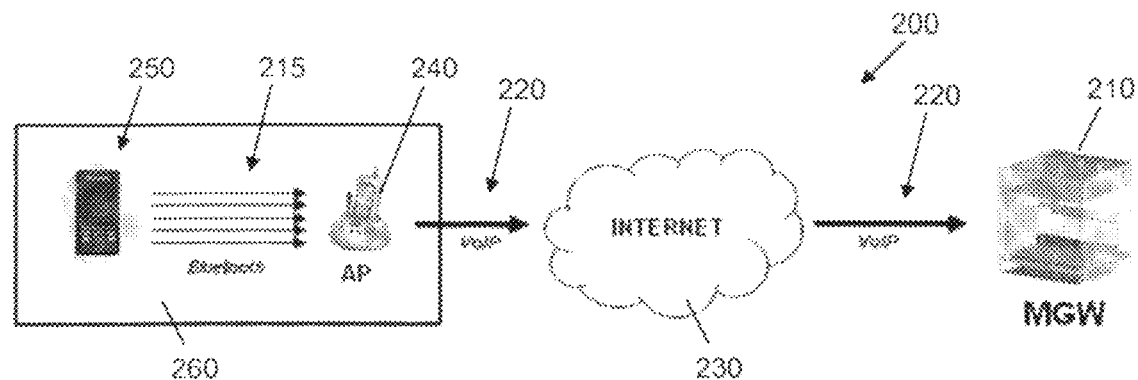
FIG. 2 illustrates an example of a telecommunication system.

Referring first to FIG. 2, there is illustrated an example of a telecommunication system 200. The telecommunication system 200 comprises a network element 240 arranged to enable communication with a plurality of local wireless communication units, illustrated generally at 250, over a first communication network. The network element 240 is further operably coupled to a second communication network, which for the illustrated example comprises the Internet 230, and is arranged to enable telephony connections 220 to be established between at least one of the plurality of local wireless communication units 250 and one or more remote devices via the Internet 230. The network element 240 is further arranged to enable a piconet to be established. In one example, a piconet may be considered as an ad-hoc computer/communication network linking a user group of devices using BLUETOOTH® technology protocols to allow one master device (e.g. network element 240) to interconnect with a plurality of active slave devices (e.g. local wireless communication units 250). Further slave devices may be inactive, or parked, which the master device can bring into active status at any time. In one example, a piconet may have a range of about 200 m and a transfer rate between about 200 and 2100 kbit/s at the application, depending on whether synchronous or asynchronous connection is used. The piconet comprises the network element and a plurality of local wireless communication units. The network element 240 is further arranged to establish a common telephony connection between the piconet and at least one remote device over the second communication network. In accordance with some examples, the network element 240 may be further arranged to establish a common telephony connection, for example in a form of a telephony conference session, between the piconet and at least one remote device, such as a media gateway (MGW), illustrated at 210.

In this manner, a single telephone conference session between a plurality of wireless communication units 250 within a common location, for example illustrated generally at 260, and one or more remote devices 210 may be established using a single connection between the common location and each remote device. Thus, users of the wireless communication units 250 are able to benefit from the flexibility provided through the use of such wireless communication units, for example in terms of being able to dial-in to the telephone conference session from substantially anywhere within range of the network element 240, whilst incurring the costs of only a single connection between the network element 240 and each remote device. Indeed, by establishing a connection to a remote device over the Internet 230, such a cost may be covered by, say, a monthly flat rate connection fee for accessing the Internet 230. Furthermore, by utilising a single connection between the network element 240 and the remote device 210, valuable network resources required to establish and maintain such a connection are kept to a minimum.

It will be understood that a telephony connection may be used for the transmission of any kind of media information by which users may wish to communicate, and is not limited to vocal/audio data. For example, telephony connections may apply to audio and video media streams, instant message based communications, gaming, etc.

For the illustrated example, the network element 240 is arranged to implement BLUETOOTH® cordless telephony profile (CTP) gateway functionality. Accordingly, the network element 240 is arranged to enable BLUETOOTH® communication with the plurality of local wireless communication units over a BLUETOOTH® communication network, as defined within the BLUETOOTH® specifications developed by the BLUETOOTH® SIG. By using an air interface technology, such as BLUETOOTH®, for providing the connection between a wireless communication unit 250 and the network element 240, a user is not charged for such a connection, thereby enabling the costs of participating in such a telephone conference session to be further reduced. Whilst in current generations of BLUETOOTH® the data rate is typically not sufficient for data services such as streaming video content and the like, it is envisaged that for future generations of BLUETOOTH® the data rate may be increased to provide for such data services.

Furthermore, for the illustrated example, the network element 240 is arranged to provide Voice over Internet Protocol (VoIP) functionality to provide telephony connectivity over the second communication network such as the Internet 230. VoIP is a general term for a family of transmission technologies for delivery of voice communications, etc., over Internet Protocol (IP) networks such as the Internet or other packet-switched networks. Accordingly, the signal processing module 320 is further arranged to provide interoperability functionality between, for the illustrated example, BLUETOOTH® connections with local wireless communication units 250 and VoIP connections with remote devices.

For the illustrated example, the remote device 210 comprises a media gateway (MGW), and as such the media gateway 210 may comprise bridging and interpreter functionality for providing interoperability between various wireless and wireline technologies, and be arranged to host a telephone conference session between users located within the location 260 and one or more other users located elsewhere (not shown). In this manner, a plurality of users within the location 260 may participate in the telephone conference session using their wireless communication units 240 with only a single connection being required between the location 260 and the media gateway 210 hosting the telephone conference session.

Figure 3:
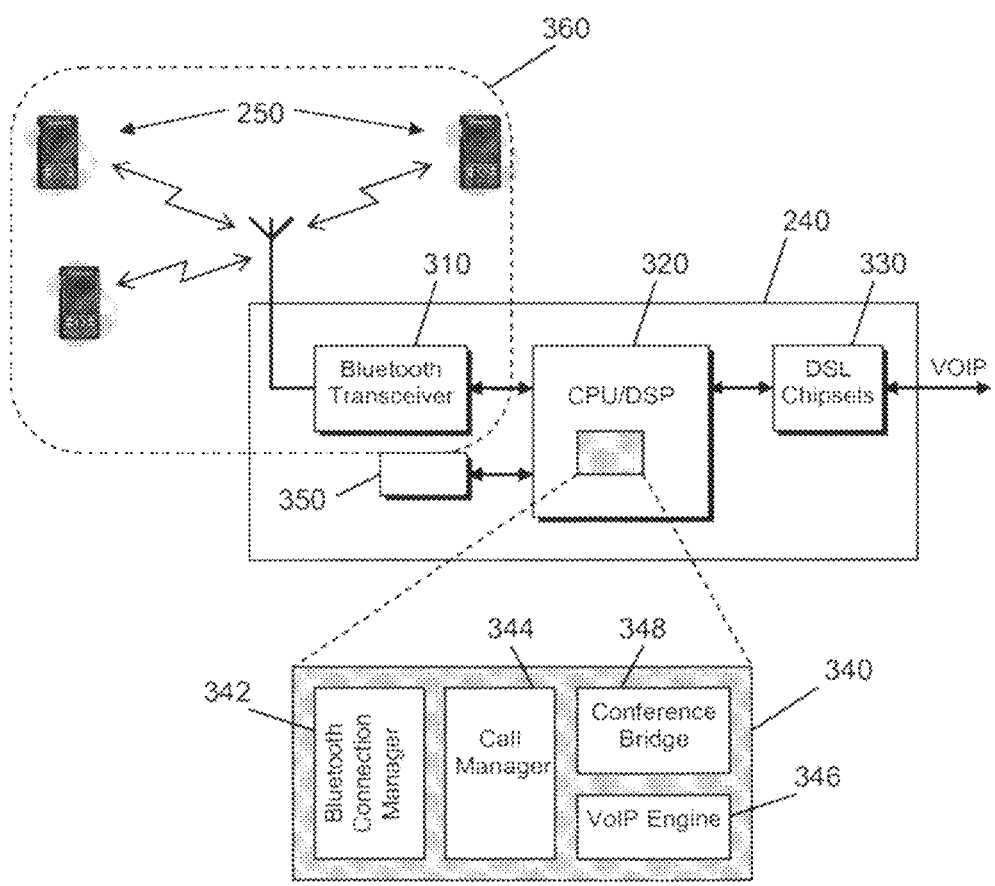
FIG. 3 illustrates an example of a network element.

Referring now to FIG. 3, there is illustrated one example of a high level architecture of the network element 240 of FIG. 2. The network element 240 comprises a radio frequency (RF) transceiver module 310 arranged to enable communication with a plurality of local wireless communication units 250 over a first communication network, such as a BLUETOOTH® network or the like. The network element 240 further comprises a signal processing module 320 operably coupled to the RF transceiver module 310 and arranged to enable one or more telephony connections to be established between the network element 240 and one or more of the plurality of local wireless communication units 250. The signal processing module 320 is further arranged to enable one or more telephony connections to be established between the network element 240 and one or more remote devices over a second communication network. Accordingly, the network element 240 illustrated in FIG. 3 may further comprise one or more digital subscriber line (DSL) chipsets 330 operably coupled to the signal processing module 320, and arranged to enable the network element 240 to be connected to the second communication network, such as the Internet 230. The network element 240 may comprise additional/alternative chipsets or interfaces for enabling the network element 240 to be connected to the, or other, external networks, for example optical/cable chipsets, etc.

The signal processing module 320 is arranged to enable a piconet to be established. The piconet comprises the network element 240 and one or more of the plurality of local wireless communication units 250 over the first communication network. The signal processing module 320 is further arranged to establish a common telephony connection between the piconet and at least one remote device over the second communication network. For example, the signal processing module 320 may be arranged to execute executable program code, illustrated generally at 340, stored within a computer-readable storage element, such as memory element 350; the executable program code is operable for establishing a piconet comprising the network element 240 and one or more of the plurality of local wireless communication units 250 over the first communication network, and for establishing a common telephony connection between the piconet and at least one remote device over the second communication network.

For example, an initial, or 'primary', wireless communication unit 250 may be able to initiate a call when in wireless communication range of the network element 240 by requesting that a connection be established with the network element 240 over the first communication network, which for the illustrated example comprises a BLUETOOTH® network. The signal processing module 320 comprises a local RF connection module, which for the illustrated example comprises a BLUETOOTH® connection manager 342. The BLUETOOTH® connection manager 342, upon receipt of the request, may then initiate a 'handshake' procedure between itself and the requesting wireless communication unit 250, and upon successful completion of the handshake, proceed with establishing a BLUETOOTH® connection with the requesting wireless communication unit 250.

Once a connection has been established between the primary wireless communication unit 250 and the network element 240, the primary wireless communication unit 250 may then request that a telephone conference session be set up. Upon receipt of such a request to set up a telephone conference session, the BLUETOOTH® connection manager 342 creates a local piconet 360 comprising itself and the primary wireless communication unit 250, with itself as the master device of the piconet 360. In this manner, a full duplex conference session may be established for the local wireless units within the piconet 360 whereby the BLUETOOTH® connection manager 342 is arranged to support communications between a plurality of local wireless communication units and at least one remote device via the piconet 360.

In this example, the signal processing module 320 further comprises a call manager module 344 arranged to manage the setup and tear down of connections and telephony sessions/calls. Upon receipt of a request to set up a telephone conference session, the BLUETOOTH® connection manager 342 is further arranged to send a request to the call manager module 344 for a conference session connection to be set up with a second communication network. For example, in a case of a packet-switched network, such as the Internet 230, upon receipt of such a request the call manager module 344 may establish a MAC (Media Access Control) address for the network element 240, and request an IP (Internet Protocol) connection be established by, for the illustrated example, the one or more DSL chipset 330.

The BLUETOOTH® connection manager 342 also establishes a 'master piconet' telephony connection with the call manager module 344 on behalf of the local BLUETOOTH® piconet 360. For the illustrated example, the signal processing module 320 further comprises an interpreter module, which for the illustrated example comprises a VoIP engine 346, arranged to receive inputs from the call manager module 344 and to transcode received connections comprising a range of different formats originating from varying voice codecs, and the like. For example, the VoIP engine 346 may transcode between AMR (Adaptive Multi-Rate), G.711 (a Telecommunication Standardization Sector (ITU-T) standard for audio companding), G.723 AIB (an ITU-T standard speech codec), etc. In this manner, the VoIP engine 346 acts as an interpreter between the different formats and voice codecs.

The call manager module 344 routes the 'master' connection to the VoIP engine 346, which converts the 'master' connection to, for example, a standard G.711 channel and routes the connection to a conference bridge 348. The conference bridge 348 is arranged to receive the master piconet connection and to aggregate the 'master' connection from the BLUETOOTH® piconet 360 and all connections from remote devices participating in the conference session. For example, the conference bridge 348 may assign unique identifiers to the master connection and to connections for the remote devices, manage in-call discussions, assign CNG (comfort noise generation) in timers of silence, manage the number of dominant users (e.g. those user(s) that are heard louder than others), etc. In this manner, the call manager module 344 establishes the piconet 360 as accessible by remote devices over a second communication network, such as the Internet 230.

The call manager module 344 then sends, via the BLUETOOTH® manager 342, a pass code and IP address to the primary wireless communication unit to enable further local wireless communication devices to join telephony conference session via the local piconet 360 and to enable remote devices to join the telephony conference session via the IP address.

For example, further local wireless communication units 250 may join the telephony conference session by sending a connection request to the BLUETOOTH® connection manager 342, in order for a connection to be established with the network element 240. Once a connection has been established with the network element 240, a requesting local wireless communication unit may then send a request to join the telephony conference session comprising the appropriate pass code. Upon receipt of such a request comprising a valid pass code, the BLUETOOTH® connection manager 342 may then add the requesting wireless communication unit 250 to the piconet corresponding to the requested conference session. In this manner, a plurality of local wireless communication units 250 are able to participate in a telephony conference session with one or more remote devices by way of such a piconet 360, whereby the BLUETOOTH® connection manager provides a 'master' connection between the piconet 360 and the conference bridge 348 hosting the conference session.

Conversely, a remote device may join the telephony conference session by establishing, for example, a VoIP a connection over, for example, the Internet 230 of FIG. 2 with the IP address, and requesting to join the telephony conference session comprising the appropriate pass code. Upon receipt of such a request comprising a valid pass code, the call manager module 344 routes the connection to the VoIP engine 346, which converts the VoIP connection to, for example, a standard G.711 channel and routes to the conference bridge 348. In this manner, one or more remote devices may participate in the telephony conference session over the external internet.

Figure 4:
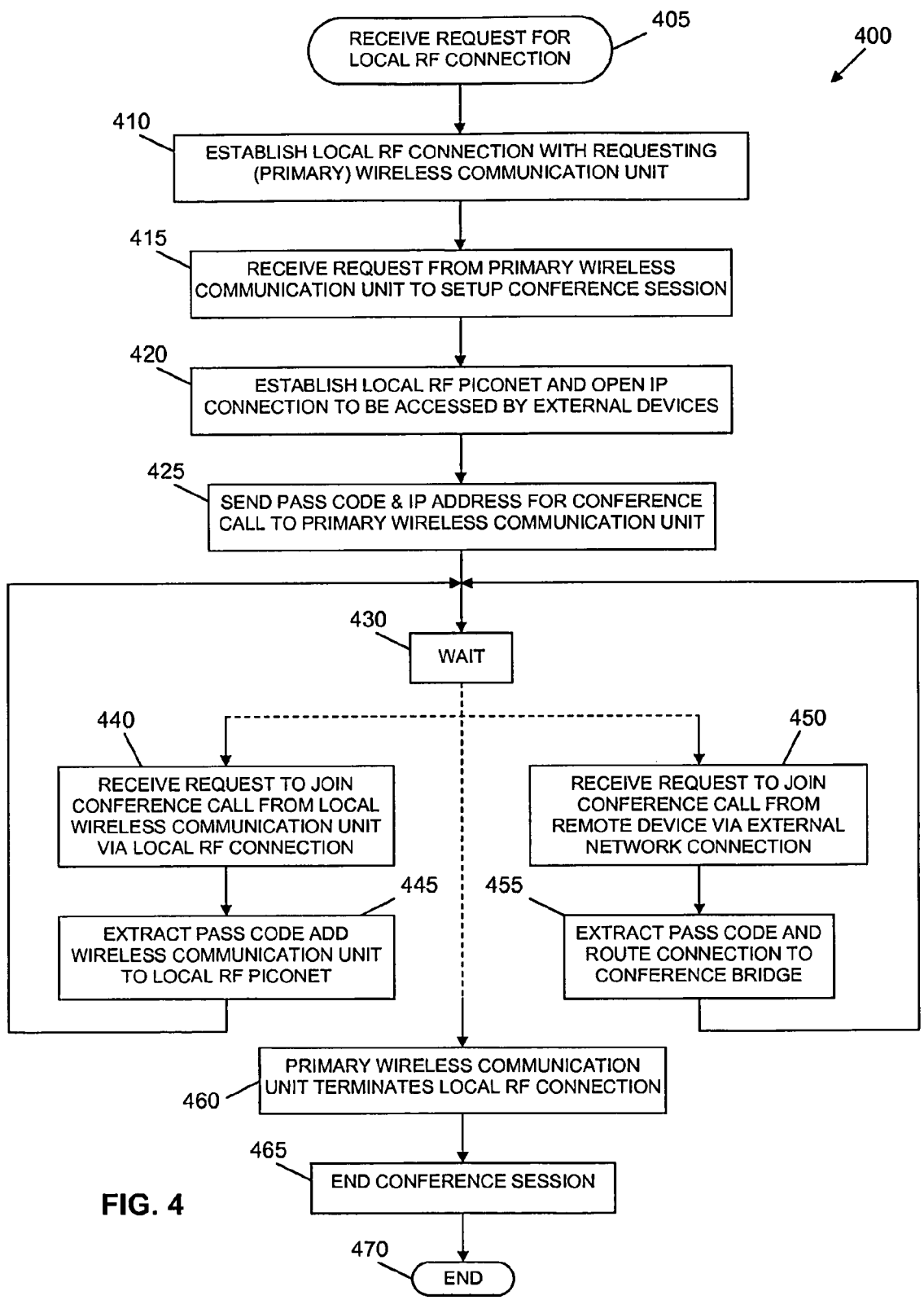
FIG. 4 illustrates an example of a simplified flowchart of a method for providing a telephony connection.

Referring now to FIG. 4, there is illustrated an example of a simplified flowchart 400 of a method for providing a telephony connection, such as may be implemented by the network element 240 of FIG. 2. The method starts at step 405 with a receipt of a request for a local RF connection, for example a BLUETOOTH® connection, from a local wireless communication unit. Next, at step 410, a local wireless connection is established with the requesting (primary) wireless communication unit. A request for a telephony conference session to be set up is then received from the primary wireless communication unit in step 415. Upon receipt of such a request, a local RF piconet is then established, including establishing and routing a master connection for the piconet to a conference bridge, and an external connection, such as an IP connection, is then established to enable access by external devices in step 420. A pass code together with an IP address relating to the telephony conference session are then sent to the primary wireless communication unit, in step 425, to enable further local wireless communication units and remote devices to join the conference session. For the illustrated example, the method then moves on to step 430, where the process waits for an event to occur.

For example, at step 440, a request to join a conference session may be received from a local wireless communication unit via a local RF connection. A pass code is extracted from the request where the pass code identifies the required conference session, and the requesting wireless communication unit is added to a piconet corresponding to the required conference session in step 445. The method then loops back to step 430.

Conversely, at step 450, a request to join a conference session may be received from a remote device via a second communication network connection. A pass code is then extracted from the request where the pass code identifies the required conference session, and the second communication network connection via which the request was received is routed to the appropriate conference bridge in step 455. The method then loops back to step 430.

If the primary wireless communication unit terminates its local RF connection, as illustrated at step 460, the method moves on to step 465 and the conference session is ended. The method then ends at step 470.

Figure 5:
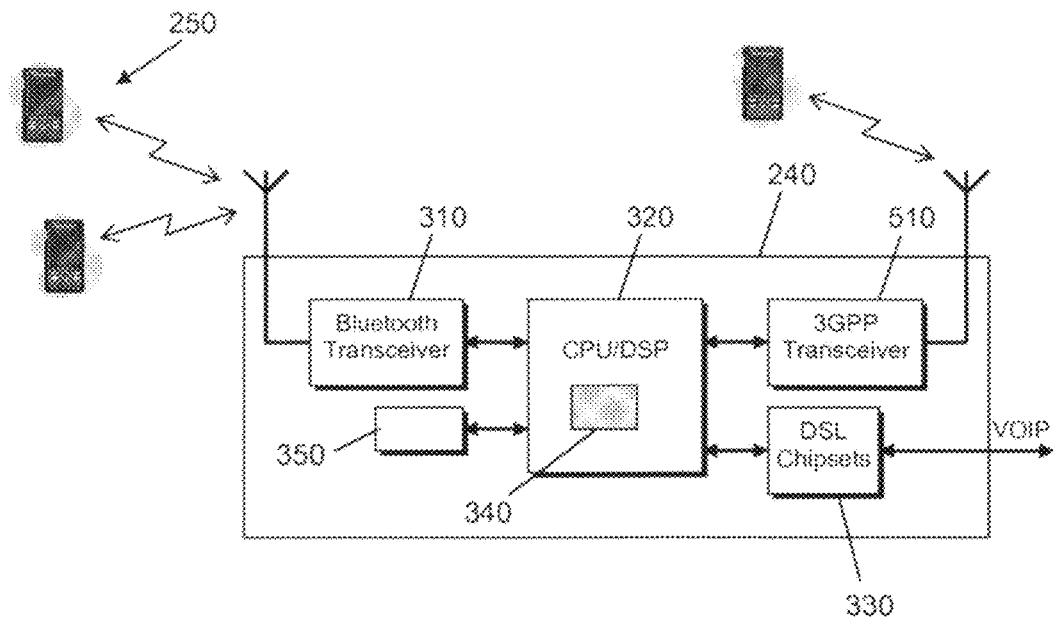
FIG. 5 illustrates an alternative example of a network element.

Referring now to FIG. 5, there is illustrated an alternative example of the network element 240 of FIG. 2. For the example illustrated in FIG. 5, the network element 240 comprises an access point for supporting communication in a femto-cell or pico-cell of a cellular communication network (with the term femto-cells being used hereafter to encompass pico-cells or similar in order to avoid confusion with references to the piconet 360 described above). An access point (AP) is a communication element that supports communications within a communication cell, such as a 3G femto-cell adapted in accordance with the $3^{rd}$ Generation (3G) of mobile telephone standards and technology, and as such provides access to the cellular communication network via the 3G femto-cell. One envisaged application is that a 3G AP may be purchased by a member of the public and installed in their home or office. The 3G AP may then be connected to a 3G access controller over a packet data network, such as the Internet 230 of FIG. 2.

Thus, a 3G AP may be considered as encompassing a scalable, multi-channel, two-way communication device that may be provided within, say, residential and commercial (e.g. office) locations, 'hotspots' etc, to extend or improve upon network coverage within those locations. Although there are no standard criteria for the functional components of a 3G AP, an example of a typical 3G AP for use within a 3GPP system may comprise some Node-B functionality and some aspects of a typical radio network controller (RNC) functionality within a macro-cell architecture.

For the example illustrated in FIG. 5, the network element 240 comprises a first RF transceiver module 310 and a signal processing module 320 arranged to enable at least one telephony connection to be established over a first communication network between the network element 240 and at least one of a plurality of local wireless communication units 250. In this example, the first communication network is a cellular communication network using a first wireless communication technology, for example via a BLUETOOTH® communication link. The network element 240 further comprises a second RF transceiver module 510 arranged to enable communication with at least one wireless communication unit located within the femto-cell via a third communication network using a second wireless communication technology corresponding to the cellular communication network, for example a 3GPP wireless communication technology. The network element 240 further comprises a signal processing module 320 operably coupled to at least the first RF transceiver module 310 and arranged to enable telephony connections to be established between the plurality of local wireless communication units 250 and one or more remote devices over a second communication network via at least the first RF transceiver module 310. Accordingly, the network element 240 illustrated in FIG. 3 further comprises one or more DSL chipsets 330 operably coupled to the signal processing module 320, and arranged to enable the network element 240 to be connected to the second communication network, such as the Internet.

The signal processing module 320 is arranged to enable telephony connections to be established between the plurality of local wireless communication units 250 and one or more remote devices over a second communication network connected thereto. The signal processing module 320 is further arranged to establish a common telephony connection, for example in a form of a conference session, between the local wireless communication units 250 and at least one remote device over a second communication network connected thereto via the first RF transceiver module 310. For example, the signal processing module 320 may be arranged to execute executable program code, illustrated generally at 340, stored within a computer-readable storage element, such as memory element 350; the executable program code operable for establishing a telephony conference session between a plurality of local wireless communication units and at least one remote device via the second communication network, as described above.

Figure 6:
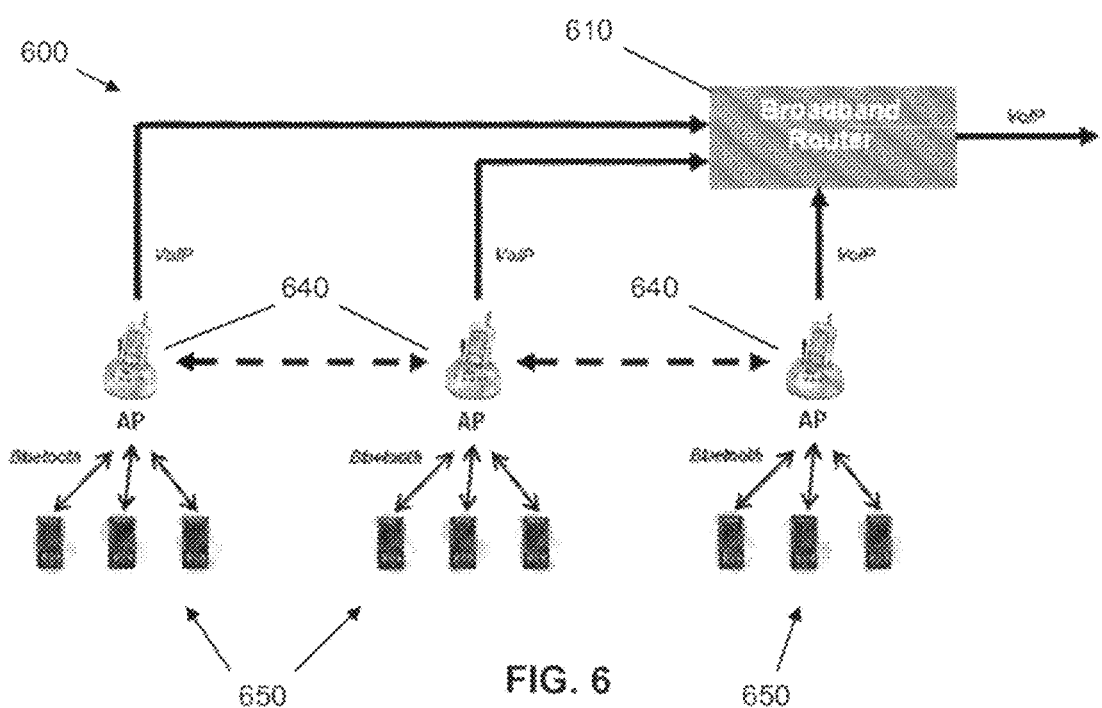
FIG. 6 illustrates an alternative example of a telecommunication system.

Referring now to FIG. 6, there is illustrated an example of a further alternative communication system 600. The communication system 600 comprises a plurality of network elements 640, for example each corresponding to the network element 240 of FIG. 2 or FIG. 5. Accordingly, each network element 640 is arranged to enable communication with a plurality of local wireless communication units illustrated generally at 650. The network elements 640 are further operably coupled to a second communication network, such as the Internet, via a broadband router 610, and in this manner are able to connect to one or more remote devices over the second communication network. In accordance with some examples, one or more of the network elements 640 is further arranged to establish a common telephony connection, for example in a form of a telephony conference session, between a plurality of local wireless communication units 250 and at least one remote device, for example via the broadband router 610. For example, the one or more network elements 640 may be arranged to host such a telephony conference session, and to establish a piconet for local wireless communication units connected thereto and participating in the conference session, as described above in relation to the network element 240 of FIG. 3.

For the example illustrated in FIG. 6, further local wireless communication units 650 may be connected to one of the network elements 640 other than that hosting the conference session. Accordingly, a primary network element 640 hosting such a telephony conference session may be arranged to extend the piconet, via one or more further network elements 640, to one or more wireless communication units connected to those one or more further network elements 640. For example, the network elements 640 may be in communication with one another, for example by way of BLUETOOTH® connections, with each network element 640 forming its own piconet with local wireless communication units connected thereto. Each network element 640 other than that hosting the conference session may then establish a 'master' connection with the network element 640 hosting the conference session, (or via a further network element 640) on behalf of its own piconet. In this manner, the network elements 640 are able to more efficiently share and manage bandwidth and network resources, both within the local RF network, and in terms of connections routed through the second communication network, such as the Internet.

In one example, a wireless communication unit 650 participating within a telephony conference session hosted by one of the network elements 640 may move, or 'roam' from the coverage area of one network element 640 to that of another network element 640. In order to prevent the wireless communication unit 650 from being dropped from the conference session, a handover procedure is required from one network element 640 to another 640. For example, when it is identified that a handover is required from a current network element 640 to a new network element 640 (for example based on signal strength, signal quality indications, etc.) the wireless communication unit 650 and the new network element 640 may establish a BLUETOOTH® connection. The wireless communication unit 650 may then be added to the piconet provided by the new network element 640 for the conference call. Once the wireless communication unit 650 has been added to the piconet for the new network element 640, it may be dropped from the piconet of the current (now old) network element 640, and the connection between the wireless communication unit 650 and the old network element 640 may be terminated.

Figure 7:
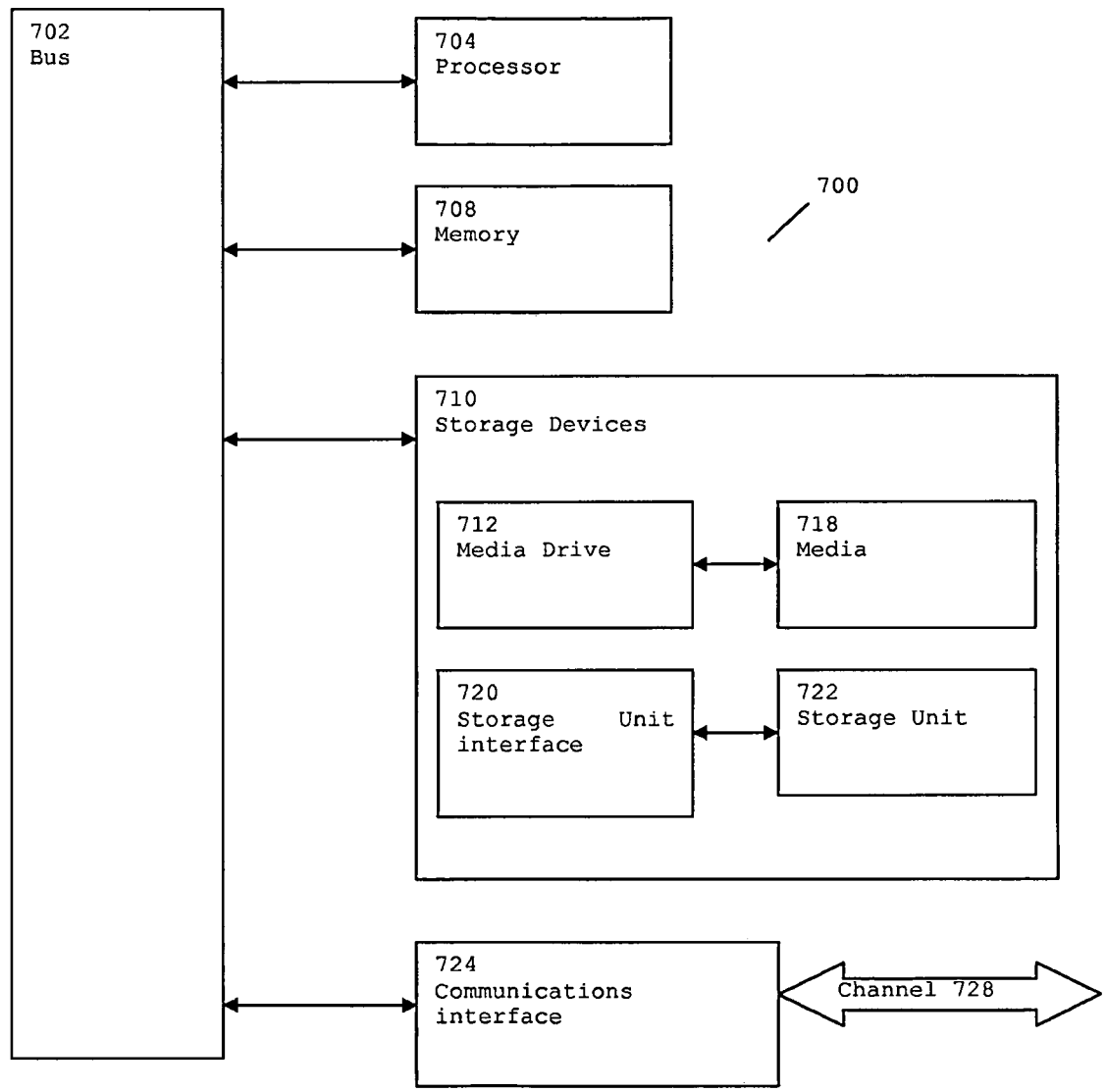
FIG. 7 illustrates an example of a computing system.

Referring now to FIG. 7, there is illustrated a typical computing system 700 that may be employed to implement signal processing functionality in examples of the invention. Computing systems of this type may be used in access points and wireless communication units. Those skilled in the art will also recognize that examples of the invention may be implemented using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 may include one or more processors, such as a processor 704. Processor 704 may be implemented using a general or special-purpose processing engine such as, for example, a microprocessor, microcontroller or other control module. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having particular computer software or data stored therein.

In alternative examples, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 may also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 722, drive 712 or communications interface 724. The control module (in this example, software instructions or computer program code), when executed by the processor 704, causes the processor 704 to perform the functions of the invention as described herein.

Thus, the invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

For example, in one example of the invention, an integrated circuit for a network element may comprise a radio frequency (RF) transceiver module and a signal processing module operably coupled to the RF transceiver module and arranged to enable at least one telephony connection to be established over a first communication network between the network element and at least one of a plurality of local wireless communication units. The signal processing module may be further arranged to enable a piconet to be established comprising the network element and the plurality of local wireless communication units and to establish a common telephony connection between the piconet and at least one remote device over a second communication network.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network element comprising:
   a radio frequency (RIF) transceiver module;
   a signal processing module operably coupled to the RF transceiver module: and
   a memory element operably coupled to the signal processing module, the memory element for storing executable program code, the executable program code configured to cause the signal processing module to receive a local radio frequency (RF) connection request for a local RF connection from a primary wireless communication unit; in response to receiving the local RF connection request, to establish the local RF connection with the primary wireless communication unit; to receive a conference session request from the primary wireless communication unit to set up a conference session; in response to receiving the conference session request, to establish a local RF piconet and opening an internet protocol (IP) connection to be accessed by at least one external device; in response to receiving the conference session request, to send a pass code and an IP address for a conference call to the primary wireless communication unit; to receive a join request to join the conference call from a remote device via an external network connection; in response to receiving the join request, to extract the pass code and routing the connection to the conference bridge; to receive an indication that the primary wireless communication unit has terminated the local RF connection; and, in response to receiving the indication, to end the conference session.

2. The network element of claim 1 wherein the signal processing module comprises a local RF connection module arranged to support communications between at least two of a plurality of local wireless communication units and the remote device via the local RF piconet, wherein the at least two of the plurality of local wireless communication units comprise the primary wireless communication unit.

3. The network element of claim 2 wherein the local RF connection module is further arranged to extend the local RF piconet, via at least one further network element, to at least one wireless communication unit connected to the at least one further network element.

4. The network element of claim 1 wherein the signal processing module further comprises a call manager module arranged to establish a master piconet connection with the RF transceiver module and to establish the piconet as accessible by the remote device.

5. The network element of claim 4 wherein the signal processing module further comprises a conference bridge arranged to receive the master piconet connection and a connection with the remote device.

6. The network element of claim 5 wherein the signal processing module further comprises an interpreter module arranged to receive connections routed from the call manager module, to transcode such received connections, and route them to the conference bridge.

7. The network element of claim 1 wherein the RF transceiver module is arranged to implement cordless telephony profile (CTP) gateway functionality with a plurality of local wireless communication units, wherein the plurality of local wireless communication units comprise the primary wireless communication unit.

8. The network element of claim 1 wherein the signal processing module is arranged to establish at least one telephony connection using a Voice over Internet Protocol (VoIP) transmission technology.

9. The network element of claim 1 wherein the network element comprises an access point for supporting communication in a femto-cell of a cellular communication network.

10. The network element of claim 9 wherein a first communication network enables at least one telephony connection between the network element and at least one of a plurality of local wireless communication units, wherein the first communication network is a cellular communication network utilising a first wireless communication technology, the network element further comprising a second RF transceiver module arranged to establish communication with at least one wireless communication unit located within the femto-cell via a third communication network using a second wireless communication technology supported by the cellular communication network, wherein the plurality of local wireless communication units comprise the primary wireless communication unit.

11. A telecommunication system comprising a network element, the network element comprising:
    a radio frequency (RE) transceiver module;
    a signal processing module operably coupled to the RE transceiver module; and
    a memory element operably coupled to the signal processing module, the memory element for storing executable program code, the executable program code configured to cause the signal processing module to receive a local radio frequency (RF) connection request for a local RF connection from a primary wireless communication unit; in response to receiving the local RF connection request, to establish the local RF connection with the primary wireless communication unit; to receive a conference session request from the primary wireless communication unit to set up a conference session; in response to receiving the conference session request, to establish a local RF piconet and opening an internet protocol (IP) connection to be accessed by at least one external device; in response to receiving the conference session request, to send a pass code and an IP address for a conference call to the primary wireless communication unit; to receive a join request to join the conference call from a remote device via an external network connection; in response to receiving the join request, to extract the pass code and routing the connection to the conference bridge; to receive an indication that the primary wireless communication unit has terminated the local RF connection; and, in response to receiving the indication, to end the conference session.

12. The system of claim 11 wherein the signal processing module comprises a local RF connection module arranged to support communications between at least two of a plurality of local wireless communication units and the at least one remote device via the local RF piconet, wherein the at least two of the plurality of local wireless communication units comprise the primary wireless communication unit.

13. The system of claim 12 wherein the local RF connection module is further arranged to extend the local RF piconet, via at least one further network element, to at least one wireless communication unit connected to the at least one further network element.

14. The system of claim 11 wherein the signal processing module further comprises a call manager module arranged to establish a master piconet connection with the RF transceiver module and to establish the piconet as accessible by the remote device.

15. The system of claim 14 wherein the signal processing module further comprises a conference bridge arranged to receive the master piconet connection and a connection with the remote device.

16. The system of claim 15 wherein the signal processing module further comprises an interpreter module arranged to receive connections routed from the call manager module, to transcode such received connections, and route them to the conference bridge.

17. The system of claim 11 wherein the network element comprises an access point for supporting communication in a femto-cell of a cellular communication network.

18. The system of claim 17 wherein a first communication network enabling at least one telephony connection between the network element and at least one of a plurality of local wireless communication units is a cellular communication network utilising a first wireless communication technology, the network element further comprising a second RF transceiver module arranged to establish communication with at least one wireless communication unit located within the femto-cell via a third communication network using a second wireless communication technology supported by the cellular communication network, wherein the plurality of local wireless communication units comprise the primary wireless communication unit.

19. A method comprising:
  receiving a local radio frequency (RF) connection request for a local RF connection from a primary wireless communication unit;
  in response to receiving the local RF connection request, establishing the local RF connection with the primary wireless communication unit;
  receiving a conference session request from the primary wireless communication unit to set up a conference session;
  in response to receiving the conference session request, establishing a local RF piconet and opening an internet protocol (IP) connection to be accessed by at least one external device;
  in response to receiving the conference session request, sending a pass code and an IP address for a conference call to the primary wireless communication unit;
  receiving a join request to join the conference call from a remote device via an external network connection;
  in response to receiving the join request, extracting the pass code and routing the connection to the conference bridge;
  receiving an indication that the primary wireless communication unit has terminated the local RF connection; and
  in response to receiving the indication, ending the conference session.

* * * * *